July 28, 1953   J. F. JOY   2,646,755
HYDRAULIC MECHANISM
Filed Jan. 21, 1947   12 Sheets-Sheet 1

Inventor:
Joseph F. Joy.
by Charles F. Osgood,
atty.

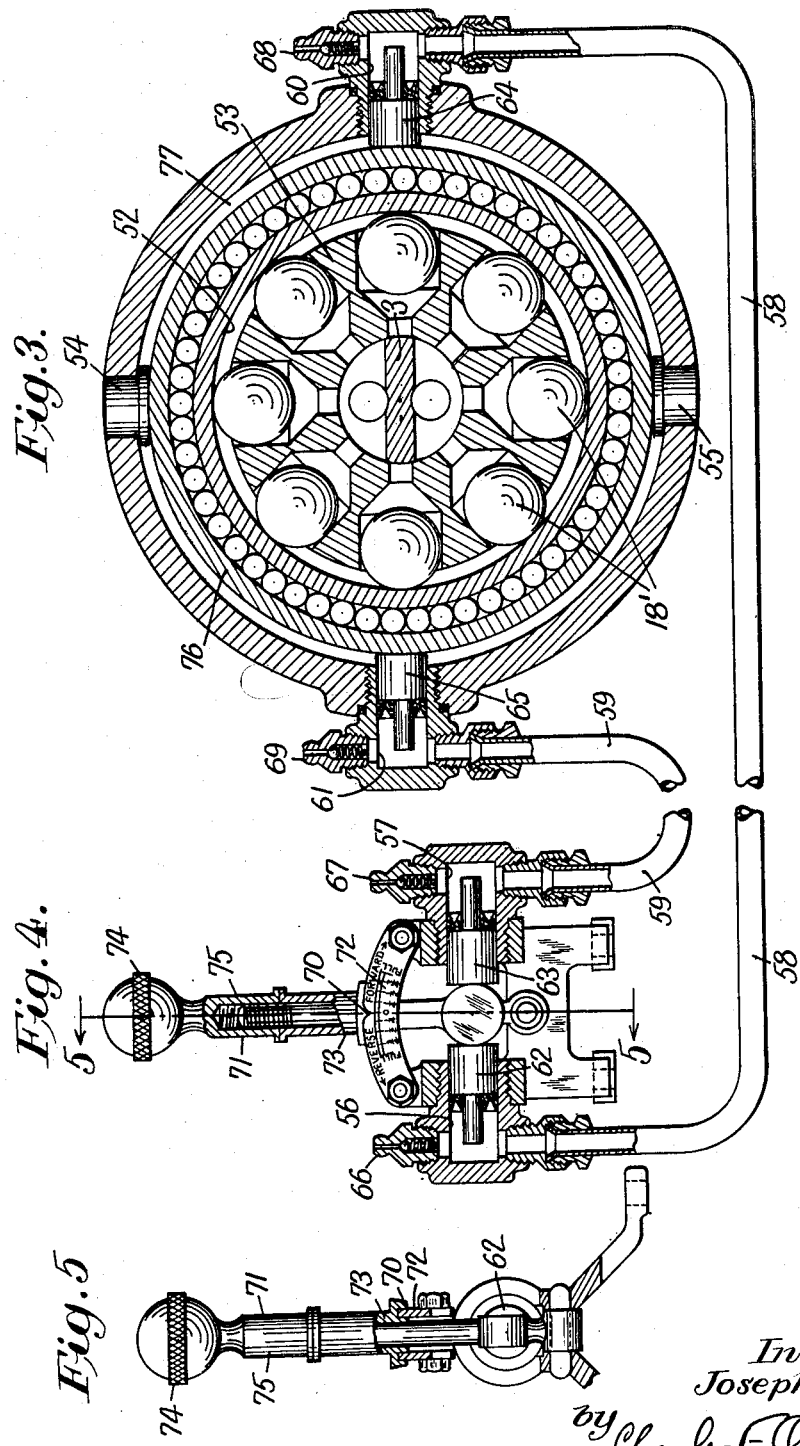

July 28, 1953  J. F. JOY  2,646,755
HYDRAULIC MECHANISM
Filed Jan. 21, 1947  12 Sheets-Sheet 3

Inventor:
Joseph F. Joy.
by Charles F. Osgood.
Atty.

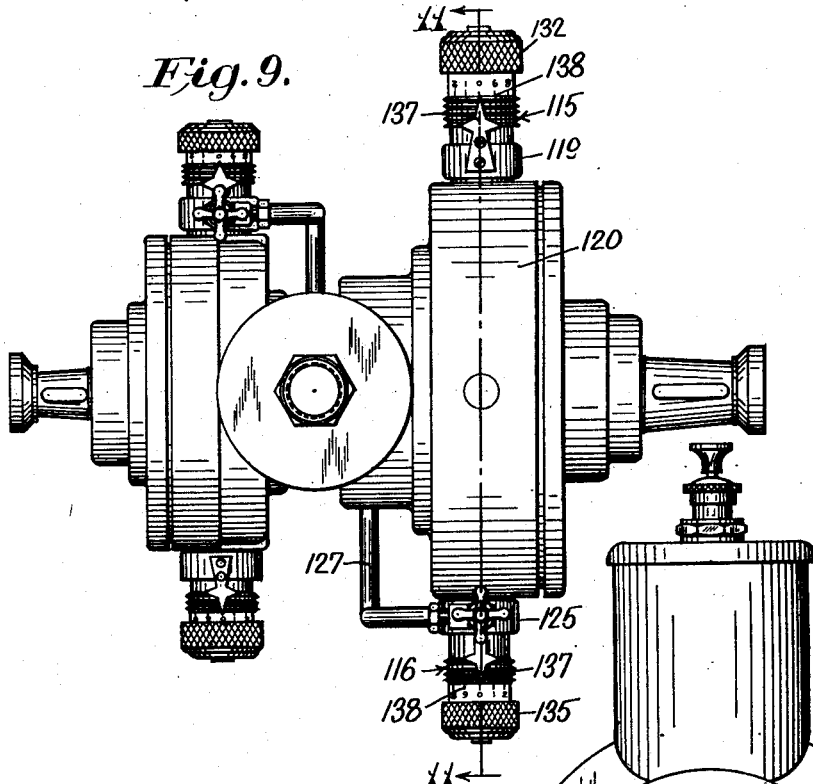
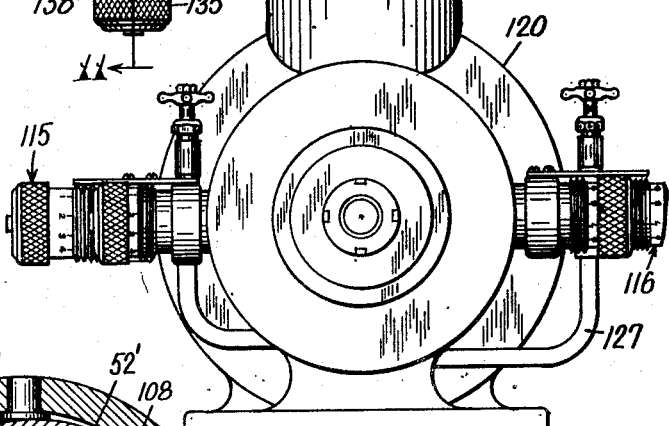
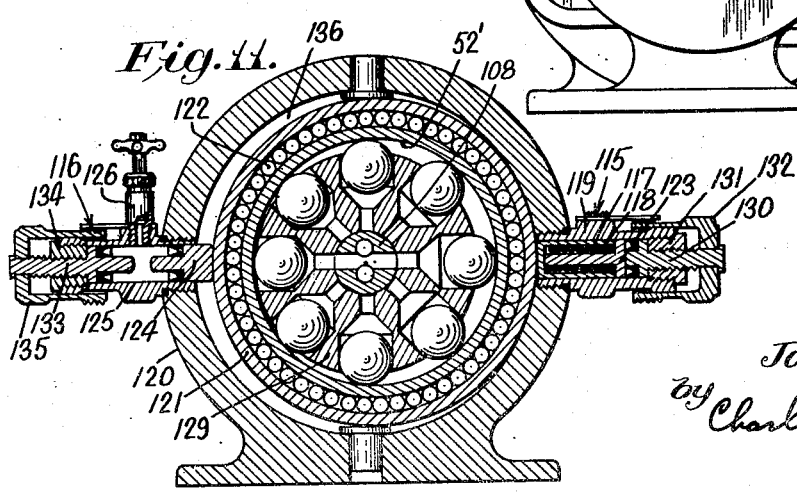

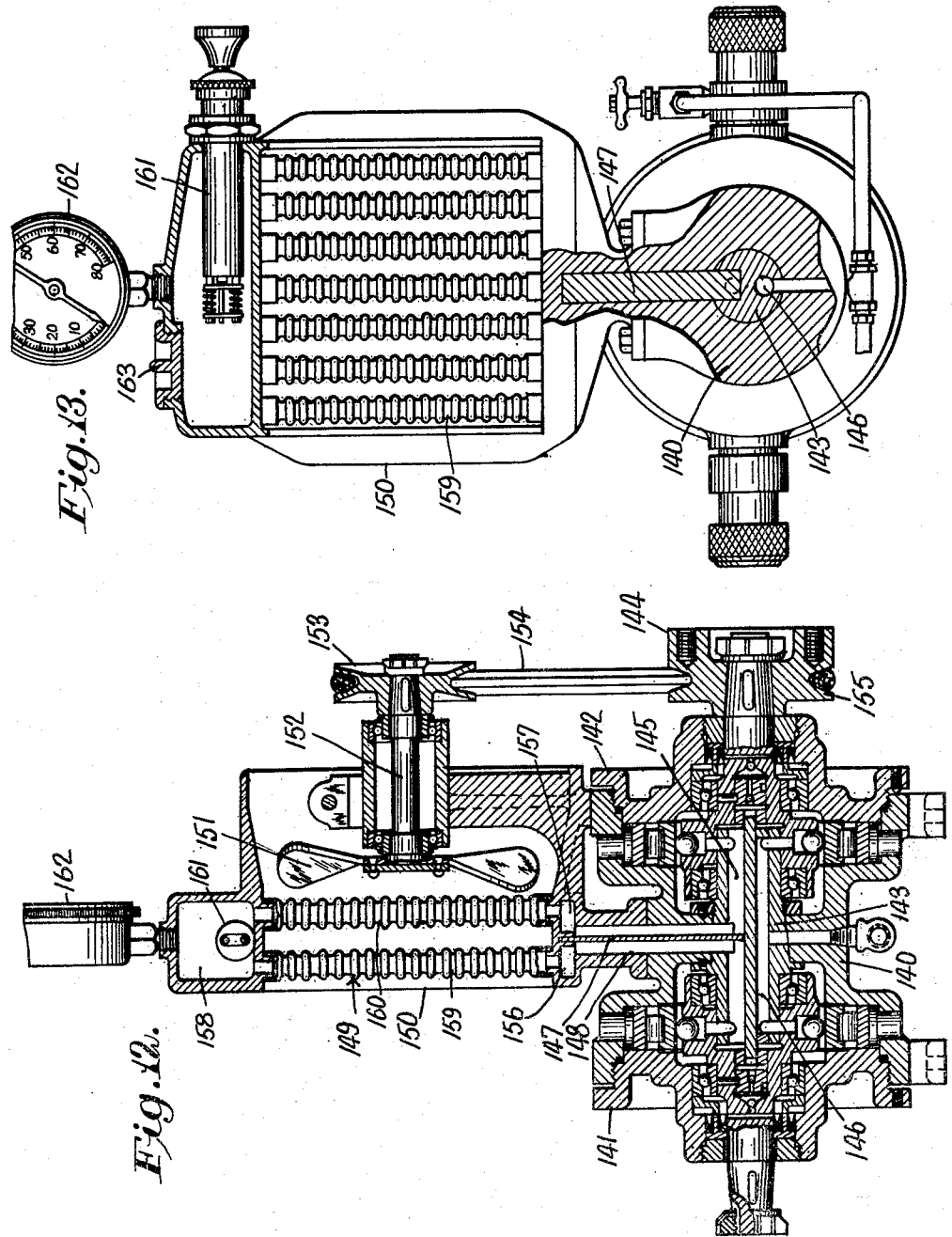

July 28, 1953  J. F. JOY  2,646,755
HYDRAULIC MECHANISM
Filed Jan. 21, 1947  12 Sheets-Sheet 7
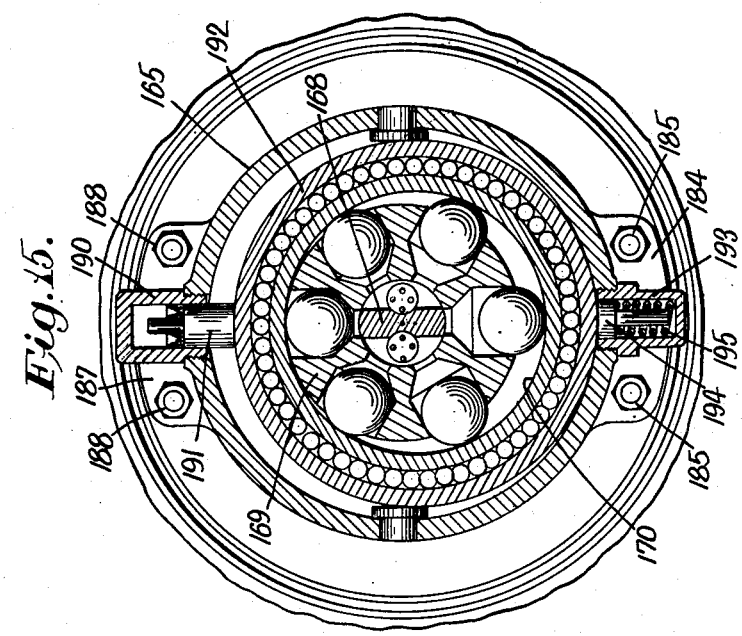
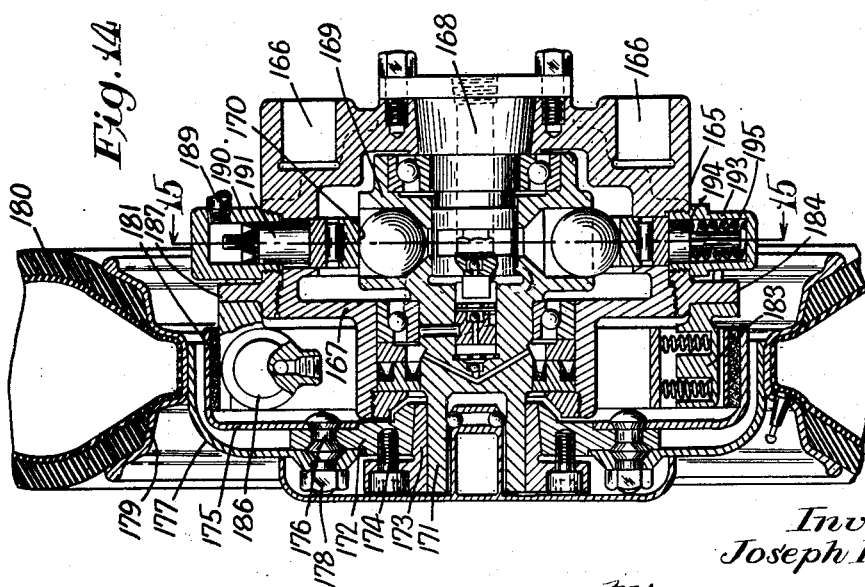
Inventor:
Joseph F. Joy.
by Charles F. Osgood,
Atty.

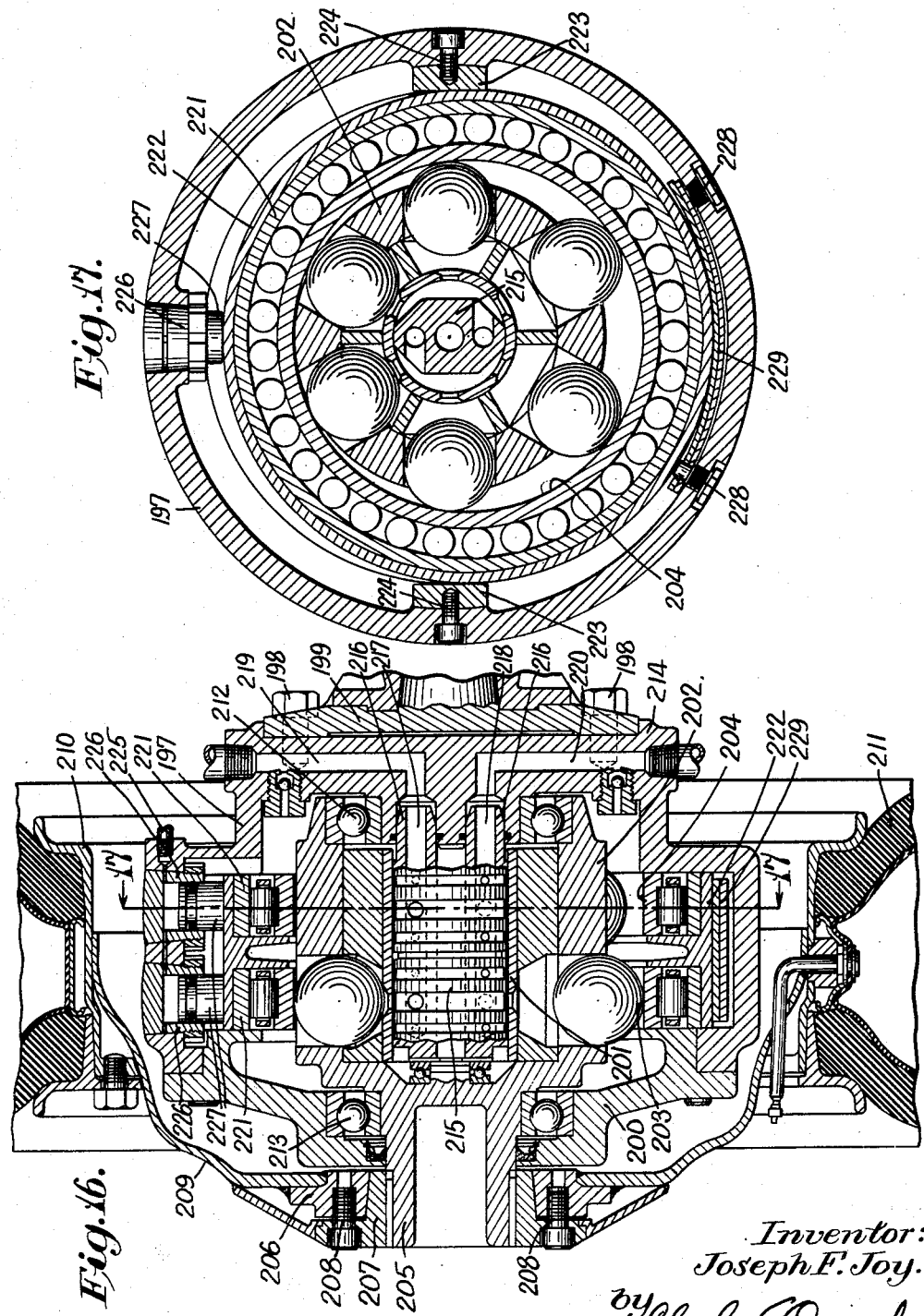

July 28, 1953
J. F. JOY
2,646,755
HYDRAULIC MECHANISM
Filed Jan. 21, 1947
12 Sheets-Sheet 9
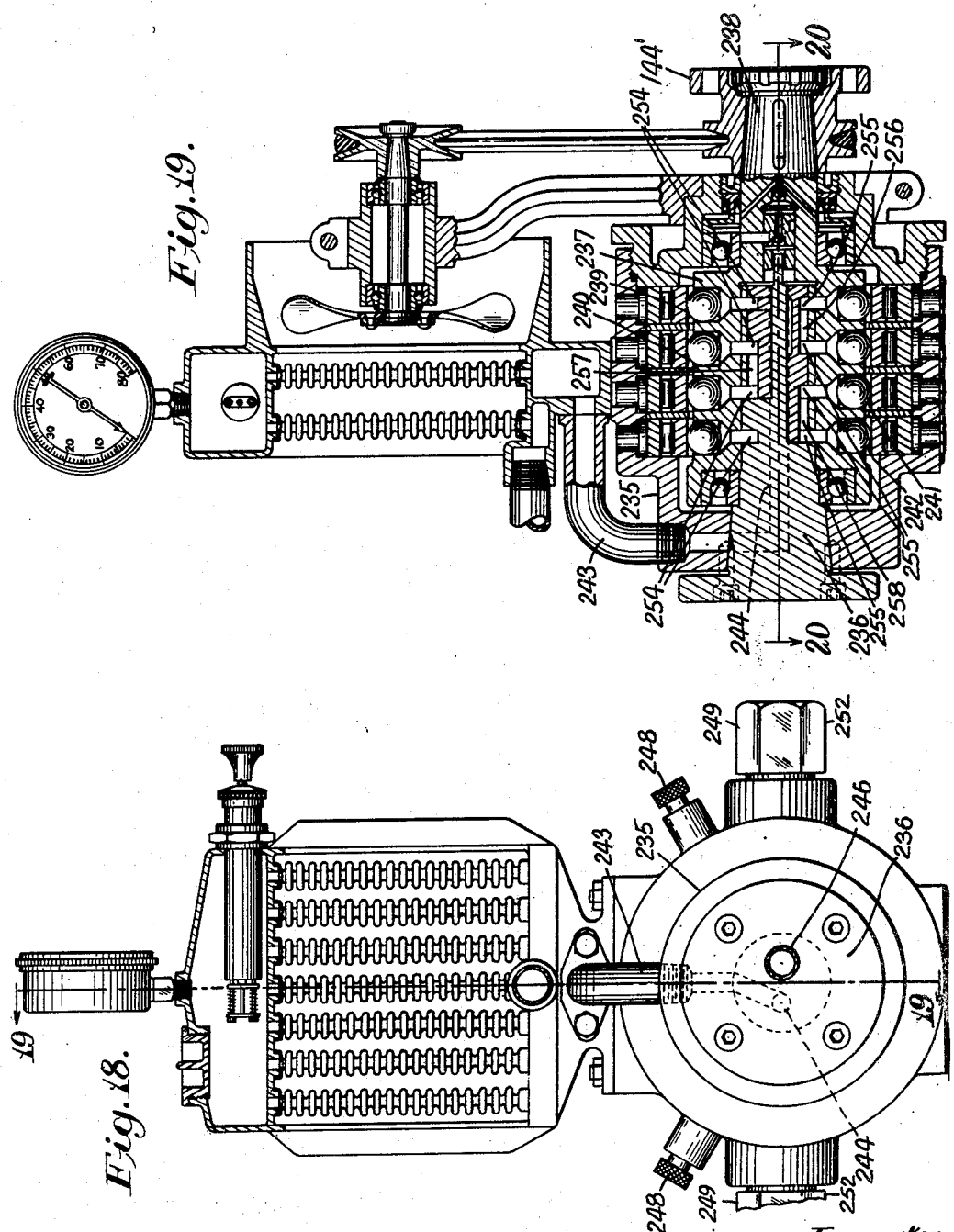
Inventor:
Joseph F. Joy.
by Charles F. Osgood,
atty.

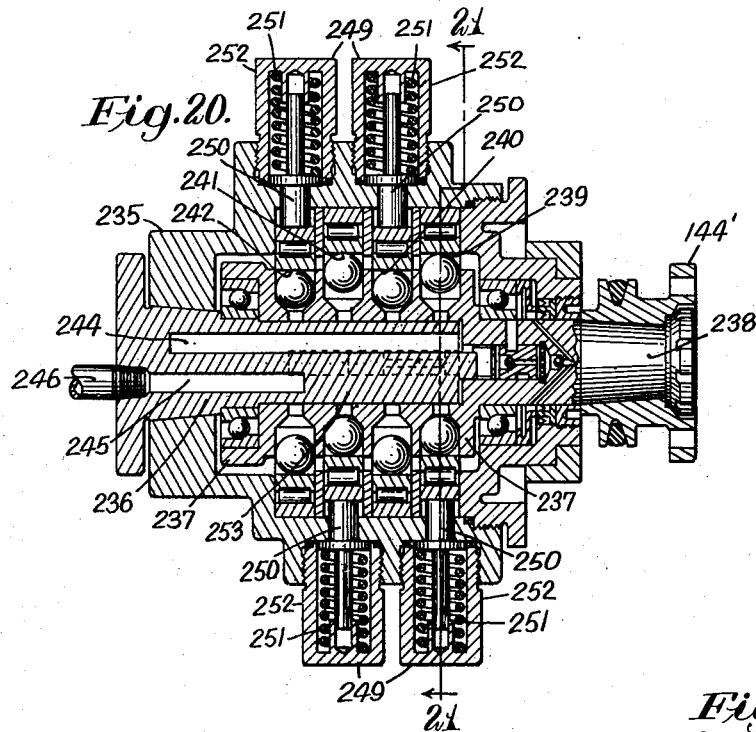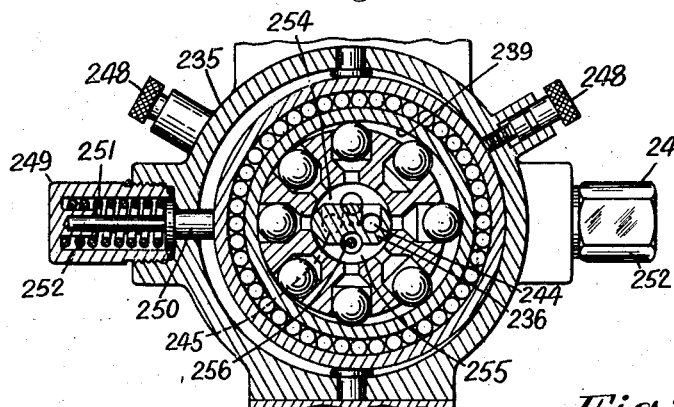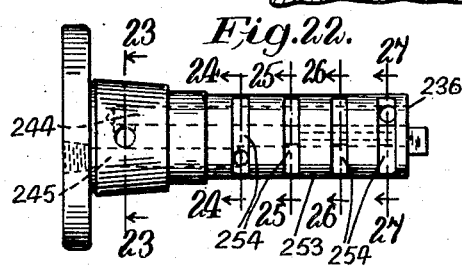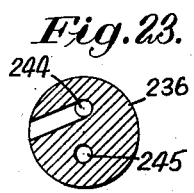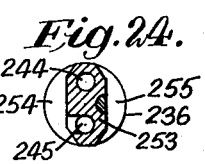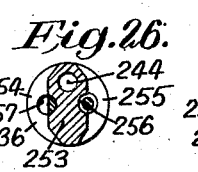

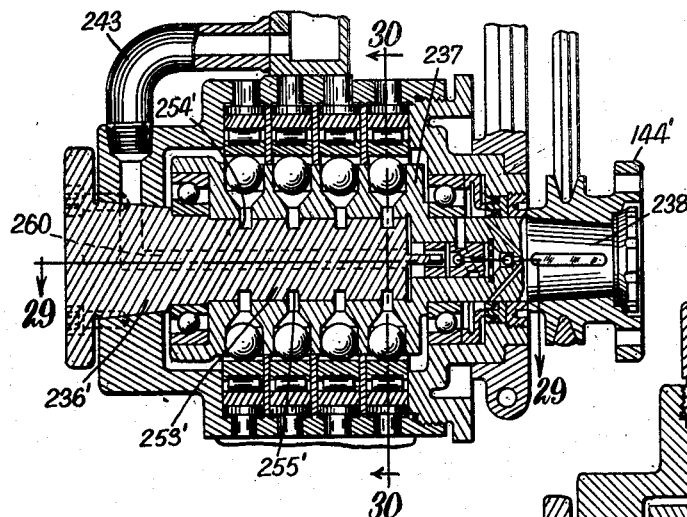
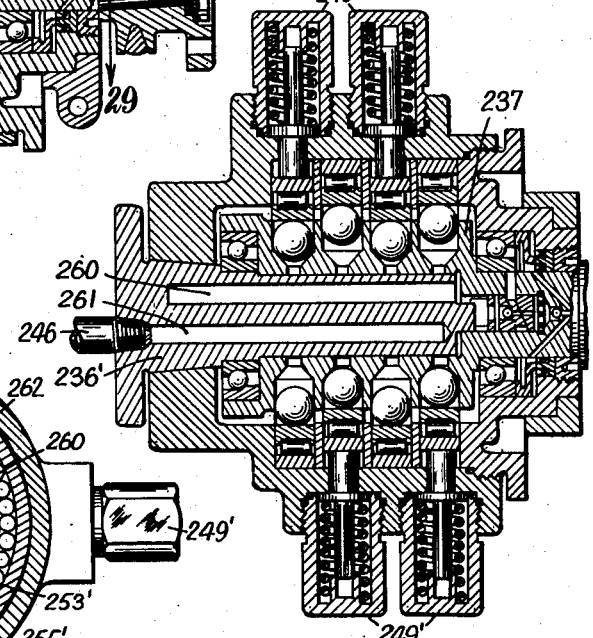
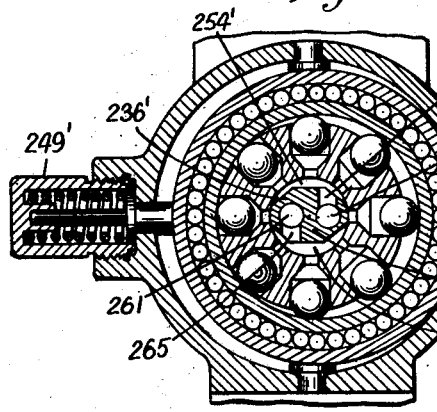
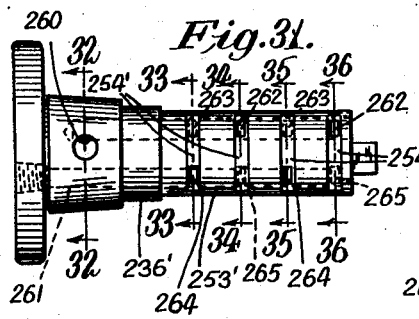
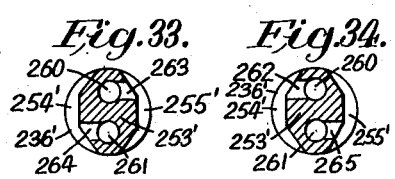
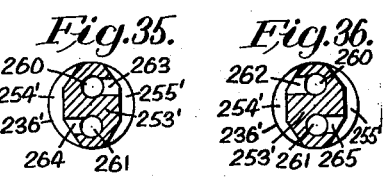
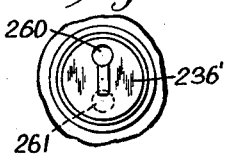

July 28, 1953   J. F. JOY   2,646,755
HYDRAULIC MECHANISM
Filed Jan. 21, 1947   12 Sheets-Sheet 12
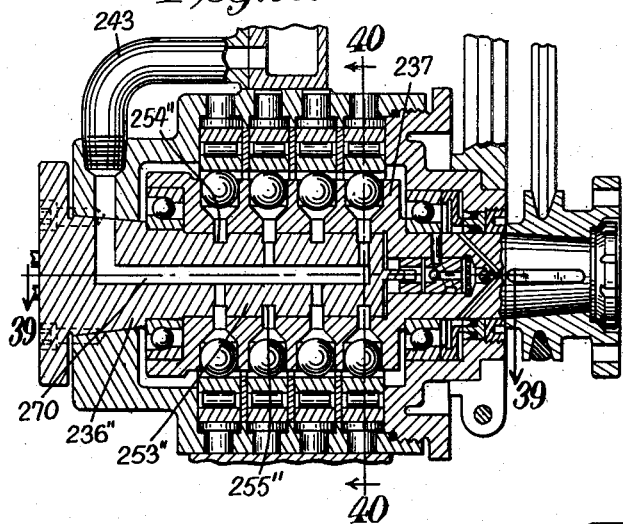
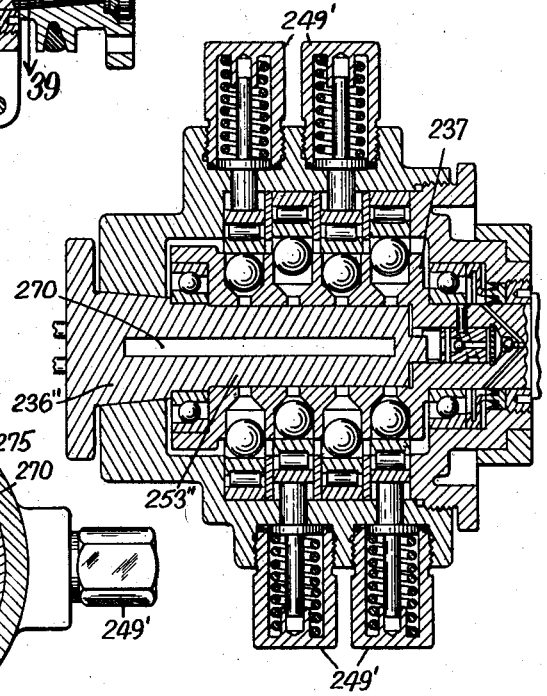
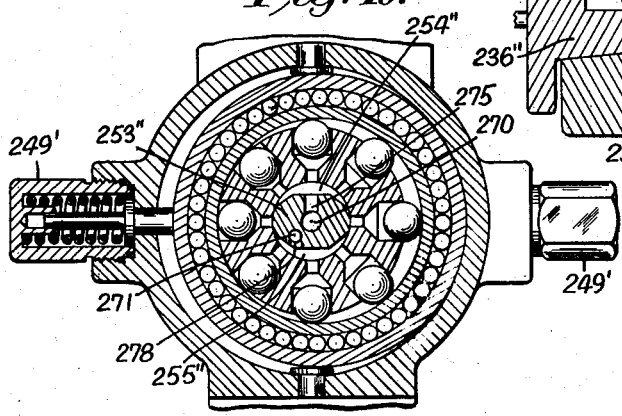
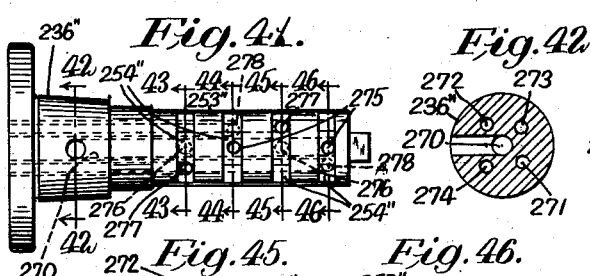
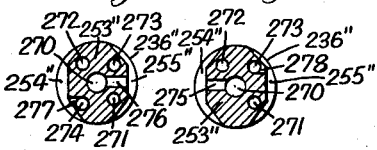
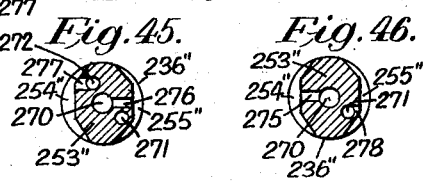
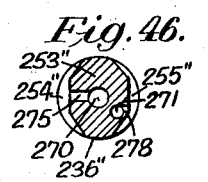
Inventor:
Joseph F. Joy.
by Charles F. Osgood,
Atty.

Patented July 28, 1953

2,646,755

UNITED STATES PATENT OFFICE 2,646,755

HYDRAULIC MECHANISM

Joseph F. Joy, Pittsburgh, Pa., assignor to Joy Manufacturing Company, Pittsburgh, Pa., a corporation of Pennsylvania Application January 21, 1947, Serial No. 723,436

10 Claims. (Cl. 103—161)

This invention relates to hydraulic mechanisms and more particularly, but not exclusively, to improvements in hydraulic pressure generators or motors together with improved control means therefor.

Hydraulic pressure generators or motors of known types usually operate at relatively low speeds and usually embody auxiliary mechanisms such as secondary priming pumps, resulting in structures which are not only excessively complicated but result in additional power losses. Moreover, single units of these known types are usually incapable of operation selectively either as a pressure generator or as a motor without change in parts or additions thereto. In such pressure generators or motors, there is danger, if operated at unusually high speed, of causing voids in the fluid cavity which reduces the responsiveness of the hydraulic column, resulting in substantial power losses. Further, in such known mechanisms, when operated at relatively high speeds, there is danger of substantial overheating as a result of the operation of the mechanism due to lack of adequate cooling means in the fluid system. Further in such known mechanisms, flexibility of operation and simplicity of construction and the desired high degree to responsiveness to controls are lacking, and due to their relatively complicated construction, are not only relatively cumbersome and heavy but are also relatively costly to manufacture. Further, because of the great number of parts heretofore common to such mechanisms and the high degree of accuracy essential to the proper coordination and functioning of so many parts in such a mechanism, only highly skilled artisans are permissible for their manufacture, installation, care and operation. By comparison with such known mechanisms, the present invention will be found to embody much fewer parts, all of simple character, and the more important members of which are standard products with leading ball and roller bearing manufacturers. Another serious weakness of other known mechanisms which prevents their successful use for the applications contemplated by the present invention is the great number of pressure-tight joints that must be maintained leak-tight under conditions of great vibration and shock. In the present invention, all high pressure conduits are internal of the mechanism, whereby absolute sealing becomes unnecessary and the outer enclosures are only required to confine the slight leakages which occur within, and means are provided for returning such leakage back into the fluid column forming the hydraulic medium. It has been common practice with known types of pressure generators and motors to provide special drain lines connected between the interior or operating cavities of such mechanisms and the sump or reservoir serving the hydraulic system. In the present invention the improved pressure generator or pump is well adapted for use in high speed operation and is entirely capable of meeting relatively severe demands of service which call for a usually high degree of responsiveness to controls and efficiency in operation, and is simple in construction, relatively light in weight, may be produced at relatively low cost, and by the provision of interchangeability of component parts, the cost of replacement and repair is relatively low.

It is accordingly a principal object of the present invention to provide a hydraulic mechanism which may be operated efficiently at relatively high speeds and which possesses a minimum of weight consistent with great durability, high efficiency, ease of application and operation, and highly responsive to the controls thereof. A further object is to provide an improved hydraulic mechanism which may be employed as either a pressure generator or a motor. Another object of the invention is to provide an improved hydraulic mechanism having improved control means whereby displacement may be readily varied. Still another object is to provide an improved multistage, fluid displacement apparatus having improved means for controlling automatically the maximum pressures in the several stages thereof. A further object is to provide an improved hydraulic pressure generator or motor embodying improved cooling means for the fluid system. A still further object is to provide an improved hydraulic mechanism which is relatively simple in design and construction and wherein wear due to friction is reduced to a minimum. Another object is to provide a hydraulic mechanism capable of use as either a pressure generator or fluid motor without change in its component parts or additions thereto whatsoever. Yet another object is to provide an improved hydraulic mechanism wherein a variation in displacement and reversal may be readily effected. A further object is to provide an improved pressure generator or motor which is embodied in a unitary mechanism and providing for wide variations between input and output speeds and torques by means of highly responsive controls capable of both manual and automatic operation. Another object is to provide an improved hydraulic mechanism embodying improved means for the salvaging of all leakage and the return of the same to the intake ports of the hydraulic fluid column, thus completely eliminating the need of external drain lines common to such mechanisms. A further object is to provide an improved pressure generator which may have different operating characteristics by a simple change of parts. A still further object is to provide an improved fluid pressure generator which may be operated as a multistage pump, a multi-power or volume pump, or a multi-delivery pump by a simple interchange of parts. Yet another object is to provide an improved fluid pressure generator or motor having a novel fluid passage arrangement and improved valve means for controlling the distribution of fluid. Still another object is to provide an improved fluid pressure generator or motor embodying an improved cylinder and piston structure and an improved cam track against which the pistons react. A still further object is to provide an improved motor drive for a traction wheel. These and other objects of the invention will, however, become more apparent in the course of the following description and as more particularly pointed out in the appended claims.

In the accompanying drawings there are shown for purposes of illustration different forms and modifications which the invention may assume in practice.

In these drawings:

Fig. 3 is a cross-sectional view of another embodiment of the invention, showing means for varying the displacement of the mechanism.

Fig. 4 is a vertical sectional view, with parts shown in full, illustrating manually operable means for controlling the variable displacement mechanism disclosed in Fig. 3.

Fig. 5 is a vertical sectional view, with parts shown in full, taken substantially on line 5—5 of Fig. 4.

Fig. 9 is a plan view illustrating another embodiment of the invention which is provided with a system of controls for regulating the speed and displacement.

Fig. 10 is an end elevational view of the mechanism shown in Fig. 9.

Fig. 11 is a cross-sectional view taken substantially on line 11—11 of Fig. 9, illustrating the variable displacement pressure generator.

Fig. 12 is a view in central longitudinal vertical section taken through still another embodiment of the invention and incorporating means for cooling the hydraulic operating fluid.

Fig. 13 is an elevational view of the mechanism shown in Fig. 12, with parts shown in vertical section to illustrate structural details.

Fig. 14 is a view in central longitudinal vertical section, illustrating another embodiment of the invention applied to a traction wheel for the propulsion thereof.

Fig. 15 is a cross-sectional view taken substantially on line 15—15 of Fig. 14.

Fig. 16 is a vertical sectional view similar to Fig. 14, illustrating still another embodiment of the invention, showing a compound motor for the propulsion of a traction wheel.

Fig. 17 is a cross-sectional view taken substantially on line 17—17 of Fig. 16.

Fig. 18 is an elevational view, with parts shown in section to illustrate structural details, illustrating a multi-stage pressure generator constructed in accordance with a further embodiment of the invention.

Fig. 19 is a vertical sectional view taken substantially on line 19—19 of Fig. 18.

Fig. 20 is a horizontal sectional view taken stantially on line 20—20 of Fig. 19.

Fig. 21 is a cross-sectional view taken substantially on line 21—21 of Fig. 20.

Fig. 22 is a plan view of the pintle shown in Fig. 20.

Figs. 23, 24, 25, 26 and 27 are cross-sectional views taken respectively on lines 23—23, 24—24, 25—25, 26—26 and 27—27 of Fig. 22.

Fig. 28 is a view in central longitudinal vertical section taken through a multi-power or volume mechanism constructed in accordance with still another embodiment of the invention.

Fig. 29 is a horizontal sectional view taken substantially on line 29—29 of Fig. 28.

Fig. 30 is a cross-sectional view taken on line 30—30 of Fig. 28.

Fig. 31 is a plan view of the different form of pintle shown in Figs. 28, 29 and 30.

Figs. 32, 33, 34, 35 and 36 are cross-sectional views taken respectively on lines 32—32, 33—33, 34—34, 35—35 and 36—36 of Fig. 31.

Fig. 37 is a fragmentary end view of the pintle shown in Fig. 31.

Fig. 38 is a central longitudinal vertical sectional view taken through a multi-delivery hydraulic mechanism constructed in accordance with still another embodiment of the invention.

Fig. 39 is a horizontal sectional view taken substantially on line 39—39 of Fig. 38.

Fig. 40 is a cross-sectional view taken substantially on line 40—40 of Fig. 38.

Fig. 41 is a plan view illustrating a still different form of pintle shown in Figs. 38, 39 and 40.

Figs. 42, 43, 44, 45 and 46 are cross-sectional views taken respectively on lines 42—42, 43—43, 44—44, 45—45 and 46—46 of Fig. 41.

Figure 1:
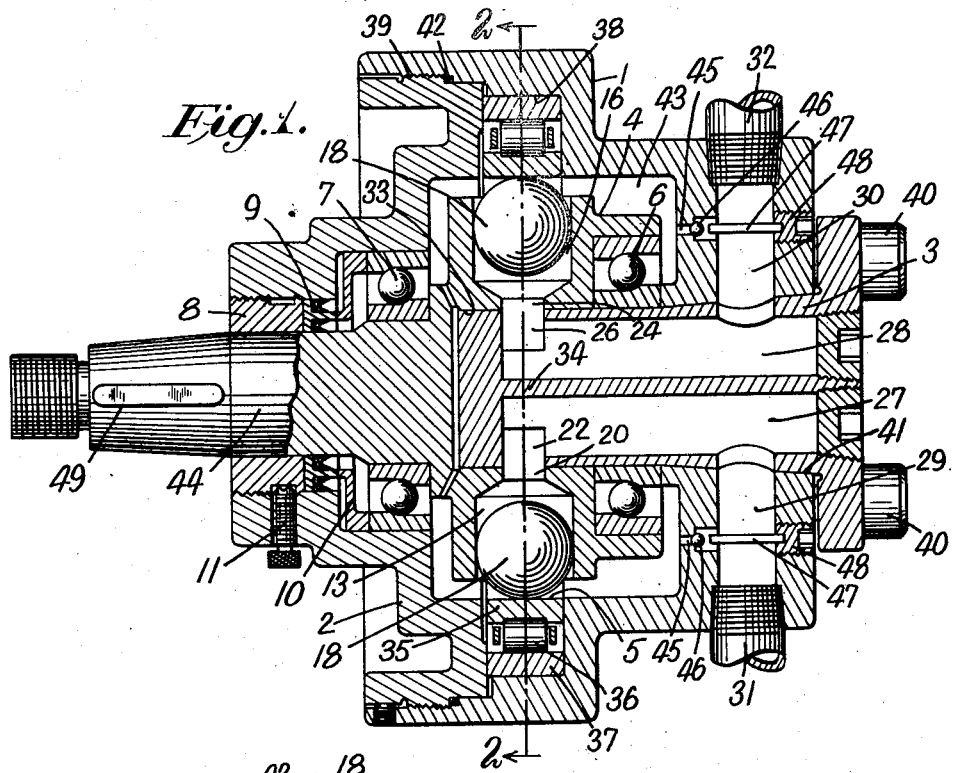
Fig. 1 is a view in central longitudinal vertical section through a hydraulic mechanism constructed in accordance with an illustrative embodiment of the invention.
Figure 2:
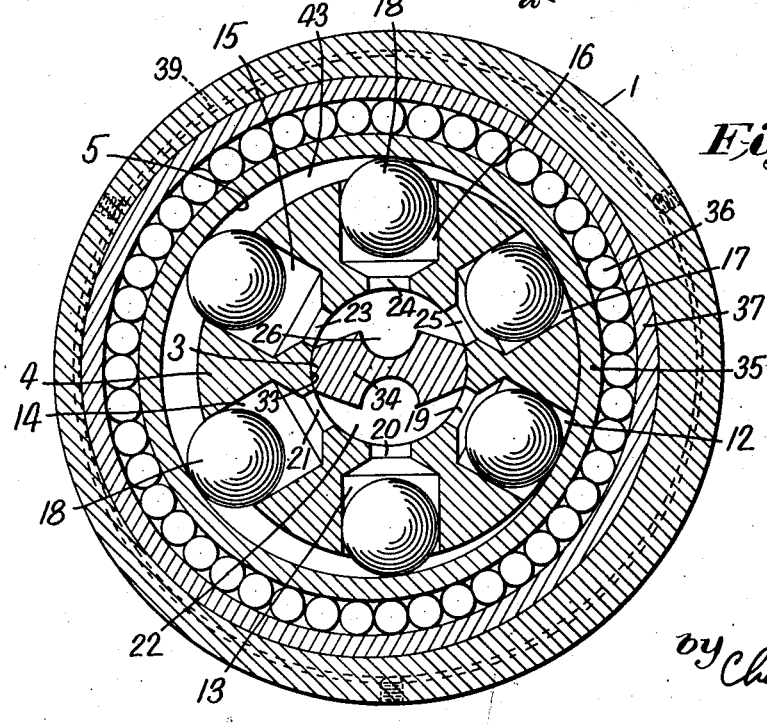
Fig. 2 is a cross-sectional view taken substantially on line 2—2 of Fig. 1 with parts shown in full.

In Figs. 1 and 2 of the drawings, there is shown a simple embodiment of the invention designed for use as a hydraulic pressure generator or motor. Referring to the drawings, it will be noted that this form of hydraulic mechanism consists of but five principal parts, namely, a casing 1, a cover 2, a stationary shaft or pintle 3, a rotor 4 and a cam track 5. The rotor 4 is mounted for rotation upon bearings 6 and 7, the former being supported by the inwardly extending portion of the pintle 3 while the latter is supported by the cover 2, thus insuring concentric operating relation at all times between the pintle 3 and the rotor 4. There is an added provision to secure concentric relation of these parts which resides in the adjustment afforded by means of a nut 8 threaded within the cover part and acting against a seal 9 and through a spring thrust ring 10 for the purpose of providing a resilient pre-loading of the bearings 6 and 7 to the extent necessary to maintain axial alinement of the pintle 3 and the rotor 4. This spring ring 10, due to its inherent resiliency, serves to compensate for external compression and expansion due to temperature changes which occur within the hydraulic mechanism during its operation. The adjusting nut 8 may be locked in adjusted position by a seat screw 11, threaded within the cover plate and engaging the bottom of an annular groove on the nut. Formed in the rotor 4 is a plurality of radially located cylinder bores 12, 13, 14, 15, 16 and 17 which contain reciprocable pistons 18, herein in the form of spheres or balls. The cylinder bores 12, 13 and 14 communicate through ports 19, 20 and 21 with a valve cavity 22 in the pintle 3, while cylinder bores 15, 16 and 17 communicate through ports 23, 24 and 25 with a valve cavity 26 in the opposite side of the pintle 3. The valve cavities 22 and 26 are respectively connected by longitudinal ducts 27 and 28 in the pintle 3 with ducts 29 and 30 formed in the casing 1, and these ducts are provided with external connections 31 and 32 respectively at the bottom and top of the casing, as shown in Fig. 1, and either of which may be used as an inlet or outlet, as conditions of operations may demand. When one of the external connections 31, 32 is connected to a source of liquid under pressure, the other connection leads to a suitable point of discharge or pressure utilization. The portion of the pintle 3 which extends within a bore 33 in the rotor forms a valve 34, as shown in Fig. 2, and serves, as shown in Fig. 1, to separate the longitudinal ducts 27 and 28, thus preventing the flow of pressure therebetween. In this instance, the cam track 5 is formed on the inner race 35 of a conventional anti-friction bearing, herein preferably a roller bearing having rollers 36 acting against an outer race 37 which is secured in a bore 38 formed in the casing 1 and is held in position in the bore by the cover plate 2 which is threadedly secured at 39 within the casing. The bore 38 is formed eccentrically with respect to the pintle 3 and the rotor 4, thus causing an offset relation between the axis of the rotor 4 and that of the cam track 5. The pintle 3 is secured to the casing 1 by means of bolts or screws 40, and an effective pressure seal is formed between the casing and the pintle by means of a tapered fit at 41. A gasket 42 is interposed between a shoulder on the casing and the cover plate 2 to provide a pressure tight joint. Any leakage of fluid past the pistons and pintle may gather in a chamber 43 in the casing, and leakage of fluid from this chamber 43 from the casing is prevented by the seal 9, which sealing engages the casing bore and the exterior of a shaft 44, herein preferably formed integral with the rotor 4. However, the fluid leaking into the chamber 43 may be vented from the chamber through passages 45 and past ball check valve 46 into duct 29 or 30, depending on which happens to be the low pressure or inlet side. Pins 47 in plugs 48 are provided for the retention of the valve balls in their operating positions. The shaft 44 projects outwardly through the nut 8 and is adapted to have connection at 49 with either driving or driven means, depending upon whether the mechanism is being utilized as a pressure generator or a motor.

In order to use the hydraulic mechanism, as shown in Figs. 1 and 2, as a pressure generator or pump, either external connection 31 or 32, depending upon the direction of rotation, will be connected to the source of fluid supply and the opposite side connected to a point of pressure utilization. For instance, in the event of right hand or clockwise rotation of the rotor, as viewed in Fig. 2, the connection 31 would lead to a source of pressure supply and the connection 32 would be the discharge point. The fluid medium employed in the mechanism should preferably be a light lubricating oil. In operation, the centrifugal forces arising out of rotor rotation causes the ball-like pistons, as well as the fluid in the rotor cavities, to move outwardly, and, obviously, the higher the speed of rotation of the rotor, the greater the centrifugal force becomes. As a result of this fact, the mechanism may be operated at unusually high speeds without the danger of causing voids in the fluid cavities. Secondary priming pumps are commonly used with other known mechanisms, the function of which is either or both that of forcing the pistons out for high speed operation and for causing complete filling of the cylinder cavities through the maintenance of pressure on the intake side. Such known mechanisms are not only excessively complicated but result in additional power losses. In the present mechanism, the need of such auxiliary devices is eliminated by taking full advantage of the centrifugal force arising out of the rotor rotation as a mens for throwing the pistons outwardly as the rotor rotates and the securement of complete cylinder filling.

Following the operation of the mechanism further as a pressure generator by referring to Fig. 2, it will be noted that clockwise rotation of the rotor 4 will cause the three lower pistons to move outwardly against the cam track 5. Fluid entering the valve cavity 22 through intake duct 27 would, through movement of the three lower pistons, be caused to enter the cylinder bores 12, 13 and 14 through ports 19, 20 and 21 respectively. It will further be noted that the filling of each cylinder bore begins as the port thereof passes the cut-off section at the right hand side of the valve 34 and ends with the port passing over a similar cut-off section provided at the opposite side of the valve 34.

The valve 34 straddles the axes of the cam track and rotor bores and, as a result of the eccentricity of these bores, the pistons are permitted to move outwardly throughout the filling range of the cylinder bores on the one side of the valve and positively forced to recede during travel on the opposite side of the valve. As a result, the three upper pistons in Fig. 2, their cylinder bores being filled with fluid, will under rotation be forced to recede through contact with the cam track 5, thus causing the fluid contained in the cylinder bores 15, 16 and 17 to be discharged therefrom, even against great pressure, if necessary, through ports 23, 24 and 25 into valve cavity 26, from whence it is conducted to the point of utilization through ducts 28 and 30 and discharge connection 32. Obviously, counterclockwise rotation of the rotor, as viewed in Fig. 2, will produce like results except with fluid flow in the opposite direction, in which case the connection 32 would become the intake and the connection 31 the discharge point. It is further obvious that if fluid under pressure were introduced to the mechanism through connection 31, clockwise rotation of the rotor as viewed in Fig. 2, would result, and a reversal of the fluid flow would result in reverse rotation.

It will further be noted that the pistons are not only free to roll on the cam track 5 but also the cam track is free to rotate with the inner bearing race 35 on the rollers 36 arranged between the inner and outer races of the bearing, thus minimizing frictional resistance of rotor movement resulting in improved mechanical efficiency. Furthermore, the freedom of the cam track to move with the ball-like pistons minimizes ball rotation and, consequently, reduces piston wear and the resulting leakage between the pistons and the walls of the cylinder bores.

In Figs. 3, 4 and 5, a slight modification of the structure shown in Figs. 1 and 2 is disclosed, in that the cam track bore is enlarged and arranged to permit a cam track 52 to move laterally to and fro across the axis of a rotor 53 for the purposes of manually regulating the volumetric displacement and the direction of fluid flow when the mechanism is employed as a hydraulic pressure generator and the regulation of speed and direction of rotation when the mechanism is operated as a hydraulic motor. As in the embodiment above described, the cam track is supported by the inner raceway of an anti-friction bearing and the structure of the cylinders and pistons and the fluid distributing valve mechanism are similar to those above described with the exception that there are eight cylinder bores in the rotor which contain eight ball-shaped pistons 18'. The outer raceway of the anti-friction bearing supporting the cam track is herein supported at its top and bottom by hardened inserts or buttons 54 and 55 carried by the casing. These buttons are preferably of hardened steel and are readily replaceable in case of wear, and are employed to overcome excessive wear of the walls of the bore of the casing at the points where the shiftable cam track has contact therewith. A still added advantage of this construction is that it permits all of the portions of the casing to be brought into alinement with one setting of the parts. Lateral movement of the cam track is accomplished by a manually operable control device shown in Figs. 4 and 5, comprising cylinders 56 and 57 which are connected by conduits 58 and 59 to cylinders 60 and 61 secured to the casing of the mechanism (see Fig. 3). The cylinders 56 and 57 contain reciprocable pistons 62 and 63 while the cylinders 60 and 61 contain reciprocable pistons 64 and 65. These cylinders and conduits are filled with a fluid medium, preferably a light lubricating oil, through filling and purging plugs 66, 67, 68 and 69 which are preferably conventional high pressure oil fittings. A conventional high pressure oil gun, such as is used for automobile lubrication, may be used for filling the fluid system. All air should be purged from the system by depressing the ball valve of the fitting at the opposite end of the system, from where oil is being pumped until air ceases to flow past the depressed ball. After the system is completely purged, it should be under sufficient hydraulic pressure to cause the desired solidity of the hydraulic column necessary for responsiveness of movement between the actuating cylinders 56 and 57 of the control device of Fig. 4 and the corresponding actuated pistons of the cylinders 60 and 61 of Fig. 3. As the aforementioned hydraulic column is being established, the system should be adjusted to cause the axis of the cam track 52 to coincide with the axis of the rotor 53 and a pointer 70 on a control arm 71 to rest at zero on an indicating segment 72. The pointer 70 is formed on each side of the base of a sleeve 73 secured to the control arm and arranged to be locked in any position by being clamped to the indicating segments by means of a threaded knob 74 at the upper end of the control arm, such locking being effected by screwing down the knob on the threaded end 75 of the control arm. It will thus be made clear that actuation of the pistons 62 and 63 of the control device of Fig. 4 causes a corresponding movement of the pistons 64 and 65 which bear against the outer member 76 of the anti-friction bearing which supports the cam track 52. It is further obvious that the cam track 52 can thereby be laterally moved within the casing chamber 77 to or fro across the axis of the rotor 53 for the purpose of varying the volumetric displacement of the rotor at any desired amount between that of zero and a maximum. Such movement will cause a reversal of fluid flow with a given direction of rotor rotation or a reversal of rotor rotation with a given direction of fluid flow, thus yielding complete control of the operation of the mechanism whether used as a fluid pressure generator or as a mechanism for the conversion of fluid pressure into rotary motion.

Figure 7:
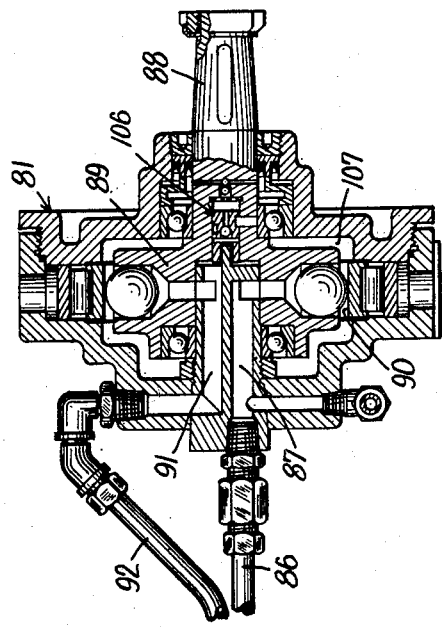
Fig. 7 is a central longitudinal vertical sectional view of a similar embodiment of the invention which is remotely connected to the pressure generator, shown in Fig. 6, to operate as a motor.
Figure 6:
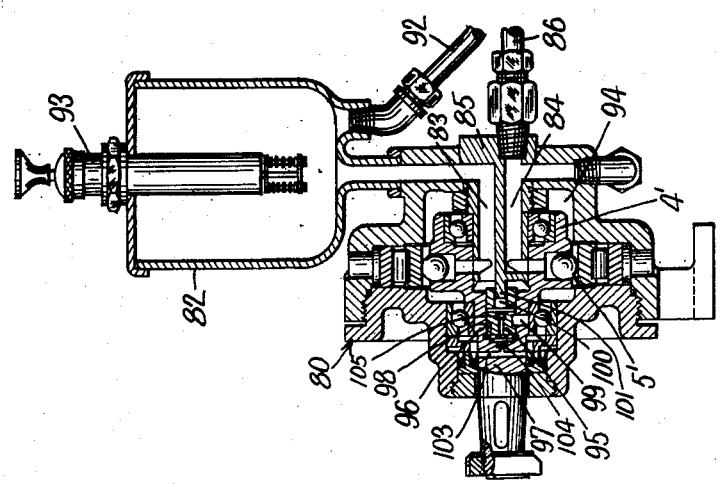
Fig. 6 is a central longitudinal vertical sectional view showing another form of the invention arranged for use as a pressure fluid generator.

In Figs. 6 and 7 there is shown another modification, wherein two of the hydraulic mechanisms, generally designated 80 and 81 respectively, may be remotely connected by a closed hydraulic fluid circuit for use as a power transmitting medium. The internal construction of this mechanism may embody constant displacement features similar to those of the mechanism shown in Figs. 1 and 2 or the variable displacement characteristics similar to those shown in Fig. 3 and provided with manual control means similar to that shown in Figs. 4 and 5, or the combined manual and automatic control means of certain of the other embodiments of the invention to be later described. In this novel arrangement, either of the units 80 and 81 may be used as the driven or driving mechanism, so long as a tank 82 is connected to the intake side of the driven unit. Assuming the unit 80 in Fig. 6 to be the driven unit, and rotation is imparted to its rotor 4' by means of an outside source of power in one direction, the cam track 5', which may correspond to the cam track shown in Fig. 3, would be moved laterally in one direction, thus causing ducts 83 and 84 in a valve pintle 85, similar to the pintle 3 shown in Fig. 1, respectively to become the fluid intake and discharge. In the case of reverse rotation, movement of the cam track 5' laterally in the opposite direction would cause the duct 84 to become the fluid intake and the duct 83 the fluid discharge. The flexibility of the variable displacement feature of the construction shown in Fig. 3 in connection with a pressure generator is thus indicated. With the mechanism shown in Fig. 6 operating as a pressure generator, it will be noted that fluid under pressure will be supplied through an external pressure conduit 86 to an internal pressure duct 87 of the mechanism 81 shown in Fig. 7, and then the latter mechanism will function to convert the fluid pressure generated by the mechanism 80 (Fig. 6) into rotary motion to be transmitted through its output shaft 88 to perform useful work. The speed of rotation of the output shaft will depend upon the displacement of both units 80 and 81 or either that of the pressure generating unit 80 or that of the output unit 81, while the direction of rotation of the output shaft 88 is dependent upon which side of the axis of the rotor 89 (Fig. 7), the cam track 90, which is similar to the cam track shown in Fig. 3, is moved to. For instance, as the cam track 90 is moved laterally in one direction to one side of the rotor axis, the rotation of the output shaft 88 would be in one direction, and likewise movement of the cam track to the opposite side of the rotor axis would result in reverse rotation of the output shaft. In either case, and regardless of the direction of rotation, cylinder filling would take place during the lower half revolution, and cylinder discharge would take place during the top half revolution in the manner described above in regard to the embodiment shown in Fig. 2, through an internal duct 91 (Fig. 7) from where it would be conducted to the tank 82 through external conduit 92. As has been previously stated, the power transmission arrangement shown in Figs. 6 and 7 operates on a closed pressure system in connection with which the tank 82 functions as both a reservoir for the oil forming the hydraulic medium and as an air chamber. The size of the tank 82 is dependent upon the amount of fluid pressure generated as a result of operation, but in the present instance, is intended only for light loads and infrequent operation, and when the mechanism is employed for heavier service, a cooling system, such as will be herein later described, can be substituted for this tank. The hydraulic fluid system should be completely filled except for a small cavity at the top of the tank 82 which should be provided for air space and expasion of the oil as the result of the increased temperature which can be expected to arise out of operation. For operation at relatively high speed, it has been found beneficial from the standpoint of cylinder filling, particularly as regarding the pressure generator or pumping end (Fig. 6), to apply air pressure on top of the oil in the tank 82. An air pump 93 is provided for that purpose and is of the type commonly used for pumping air into blow torches and pneumatic tires. The air cushion thus provided under pressure, resting upon the hydraulic oil column, tends to solidify the oil column conducive to complete cylinder filling permitting the use of smaller conduits and also serves to absorb any vibration and shocks common to the hydraulic fluid column of all similar mechanisms. Since one of the principal objects of the invention is the securement of maximum power with a minimum of weight, high speed of operation is obviously the greatest contributing factor thereto. It has heretofore been necessary to operate previous mechanisms of the present type at relatively low speeds, and the chief reason for such low speed operation in previous mechanisms, aside from balancing difficulties, has been incomplete cylinder filling. To overcome this, auxiliary pumps have been commonly used to supply fluid under pressure to the intake side of such pressure generators or pumps. Such a system, while effective for the purpose, has the disadvantages of increased weight, additional complications to what is usually an already complicated mechanism, and greater mechanical losses. In order to insure complete cylinder filling at extremely high speed operation, in addition to the air pressure loaded hydraulic oil column, there is provided a scavenger pump located in the interior of the rotor. The function of the scavenger pump is to eliminate resistance to the outward movement of the ball-like pistons by the filling of the casing chamber 94 (Fig. 6) with fluid as the result of internal leakage. The scavenger pump consists of a piston 95 reciprocably mounted in a cylinder 96 formed internally of the shaft extension 97 of the rotor 4'. The piston 95 is provided with a radially disposed cam track 98 which engages a pin 99 secured to the rotor 4'. The piston 95 is provided with a cross slot 100 at the end thereof opposite from the cam track 98, and this slot 100 engages a rectangular-shaped extension 101 formed on the inner end of the valve pintle 85. The cross slot 100, coacting with the rectangular-shaped extension 101 of the pintle 85, while preventing rotation of the piston 95 in the cylinder 96, permits longitudinal movement of the piston, thereby causing the piston to move back and forth in the cylinder as a result of the cam track 98 engaging the pin 99 as the rotor 4' revolves. As the piston 95 moves axially outwardly of the cylinder 96, a partial vacuum is created at its inner end, causing any oil that has accumulated in excess amount in the casing chamber 94 to flow into the cylinder 96 through a port 103 in the shaft 97. Upon the return on inward stroke of the piston 95, the oil is trapped in the cylinder 96 through the closing of a valve 104 and discharges through a valve 105 into the cross slot 100, from where it is free to flow into the intake duct 84 by reason of the rectangular extension 101 being less in width than the cross slot 100. A similar scavenger pump, generally designated 106, is provided in the output unit 81 for removing excess oil leakage from the casing chamber 107. The structural features of these scavenger pumps are illustrated on an enlarged scale in Fig. 8. In operation, these scavenger pumps serve to maintain a partial vacuum in the casing chamber 94 and 107, thus assisting in effecting outward movement of the ball-like pistons and greatly contributing to the complete filling of the cylinders at high speed operation. Furthermore, it is a well known fact that great heat arises out of the high speed operation of such mechanisms with the casing chambers completely filled with oil. Therefore, the scavenger pumps perform a very useful purpose, regardless of whether the mechanism is used as a pressure generator or a pressure motor by removing internal leakage as it occurs without the use of special outside drain lines.

Figure 8:
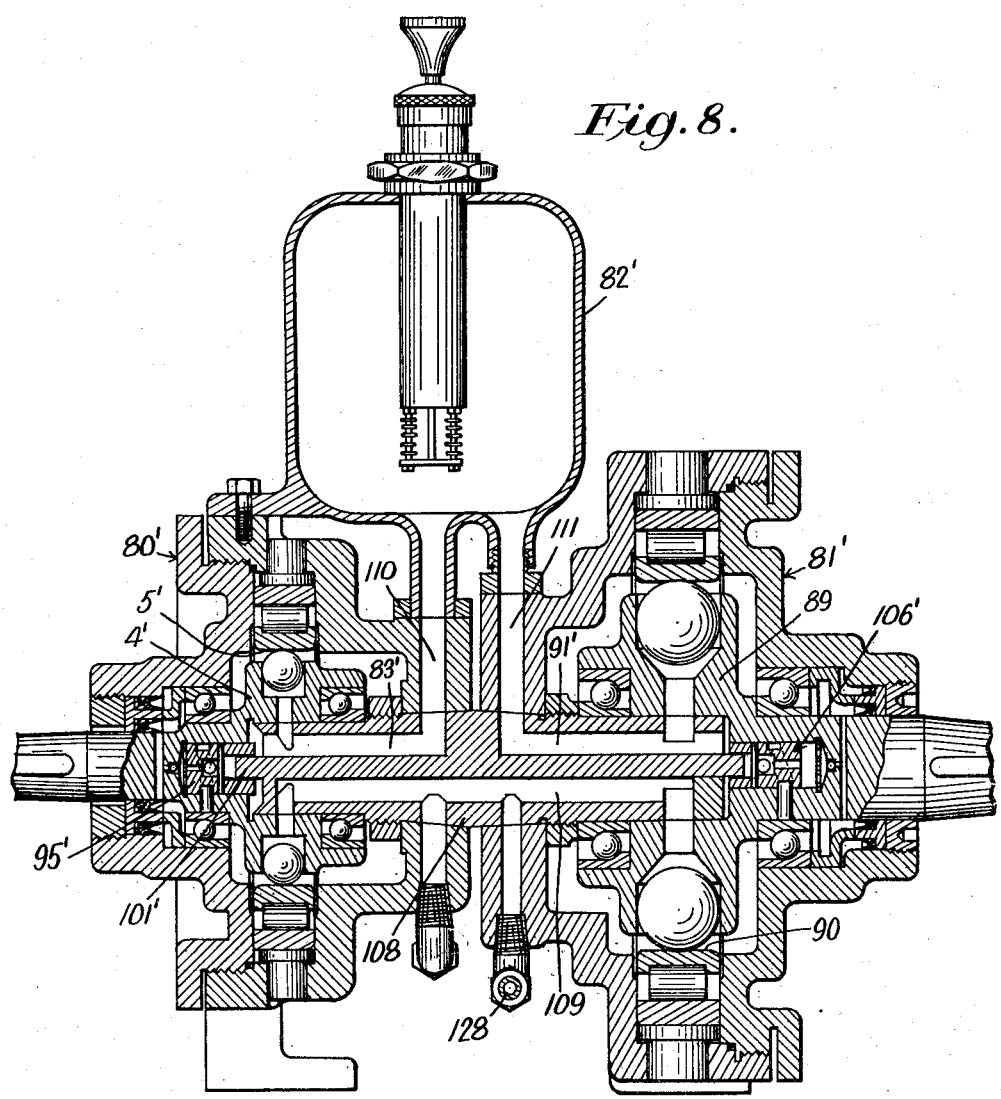
Fig. 8 is a central longitudinal vertical sectional view showing the mechanisms of Figs. 6 and 7 assembled into a unitary hydraulic mechanism.

In the modification shown in Fig. 8, the two mechanisms shown in Figs. 6 and 7 are assembled into a unitary hydraulic mechanism with the pressure generator unit generally designated 80' and the output unit generally designated 81' secured together by a common pintle 108. Obviously since both ends of this assembly are alike in character either end may be used as the pressure generator and the other the output unit depending upon demand requirements. In this construction, the two units are arranged in adjacency with the tank 82', mounted directly at the tops thereof. The ducts 84 and 87, in this construction, are combined into a single duct 109 in the common pintle 108, while the ducts 83' and 91' are both formed in the common pintle 108 and are connected through passages 110 and 111, respectively formed in the casings of the units and communicating directly with the tank 82'. The scavenger pump of the pressure generator unit 80' has its piston 95' connected directly with a rectangular extension 101' to the adjacent end of the common pintle 108, while the piston of the scavenger pump 106' is similarly connected with the opposite end of the pintle. Otherwise, this unitary mechanism embodies the same features of construction and principles of operation as have been heretofore described in connection with Figs. 1, 2 and 3 and more particularly with Figs. 6 and 7.

In the modified embodiment of the invention shown in Figs. 9, 10 and 11, there is provided an improved system of controls for the regulation of the speed and displacement of the pressure generator and output mechanisms. These controls differ somewhat from the control means provided for manual operation and disclosed in Figs. 3, 4 and 5 in that they are attached to and form an integral part of each mechanism, as generally designated 115 and 116 in Fig. 11. They consist, in the main, of spring loaded pressure responsive devices acting against opposite sides of the cam track 52', which is similar to the cam track shown in Fig. 3, for the purpose of automatically controlling the volumetric output of pressure generation and the speed of the pressure motor within the desired ranges. Provisions are also made for the manual adjustment of these characteristics where constant volumes and speeds are desired. By referring to Fig. 11, it will be seen that the spring loaded device 115 consists of a spring 117 enclosed within a plunger 118 for operation within a cylinder 119 attached to the casing 120 of the output unit. The spring 117 urges the plunger 118 inwardly and serves to exert a predetermined pressure through the plunger 118 against the outer race 121 of a cam track bearing 122; and plunger 118 is forced outwardly, as the spring pressure is overcome, by pressure acting against the opposite side of the cam track. The outer end of the spring 117 bears against the head of a pin 123. At the opposite side of the mechanism is the spring loaded device 116, arranged to counteract the spring pressure of the opposed device 115 just described, and comprises a piston 124 arranged for longitudinal movement in a cylinder 125 and which exerts its pressure against the outer race 121 of the cam track bearing at the side thereof opposite from the plunger 118. The cylinder 125 is connected to the pressure duct of the mechanism through a valve 126, conduit 127 shown in Fig. 9, and connection 128 shown in Fig. 8. The piston 124 therefore becomes responsive to whatever pressure exists in the fluid column. Fig. 11 depicts the motor or output end of a power transmission and, as shown, indicates operation at maximum piston stroke, a condition yielding maximum torque and minimum speed of rotation for a given fluid input. Obviously, as the load imposed on the mechanism is reduced, the pressure is reduced on the piston 124 under which condition the spring 117 reacts to move the cam track 52' toward the axis of the rotor 129, thus shortening the piston stroke and increasing the rotor speed. The foregoing assumes a constant fluid input; however, the same control devices shown in Fig. 11 may be applied in reverse order to the pressure generator end of the power unit to likewise act, except in the reverse order, to decrease the volumetric displacement of the generator as the result of increased pressure on the control piston. In other words, the control devices are interchangeable with each other for the purpose of coordinating the direction of fluid flow with the direction of desired rotation, and are also interchangeable between units to permit of wide variations of speed of the output shaft with that of the input shaft by an infinite number of steps between that of zero and that of high overdrive, all of which is automatically regulated so as to avoid output demands exceeding or overloading the driving medium connected to the input shaft.

In addition to the aforedescribed automatic controls, there is also provided means for effecting manual control whereby the cam tracks of the mechanism may be moved to and locked in any desired position of adjustment for effecting control of the volumetric displacement, the direction of fluid flow of the pressure generator and the direction of speed of rotation of the output shaft. This improved manual control consists of a threaded stem or screw 130 threaded within a plug 131 attached to the spring cylinder 119 and which is arranged to be adjusted against the spring pin 123 as by a knob 132 secured to the stem. The control device 116, at the opposite side of the cam track, includes a threaded stem or screw 133 which is threaded within a plug 134 attached to the cylinder 125, and this stem is arranged to be screwed inwardly and bear against the stem of the piston 124 as by a knob 135 screwed to the stem. Obviously, by screwing the stem 130 of the control device 115 inwardly, the outer race 121 of the cam track can be caused to move across the axis of the rotor 129 to the opposite side of the cam-track-bore 136, thereby resulting in opposite rotation of the rotor. It is further obvious that the cam track may be locked in any intermediate position of adjustment as the result of being firmly clamped between the screws 130 and 133. It is further obvious that the manual adjustment may be used in combination with the aforedescribed automatic controls as a means for limiting the range of automatic control in either or both the input or output ends of the mechanism as may become desirable under certain operating requirements. It is also clear that in the simple system of control provided, a standard mechanism may be caused to operate so that the input end has a constant displacement while the output end is automatically variable or vice versa, or both ends may have either constant or variable displacement as may be desired. In order to make displacement adjustments accurately, there are provided pointers 137 attached to the control cylinders and indicating on micrometer graduations 138 on the operating knobs which indicate by an infinite number of steps the exact percentage of displacement delivered by a given setting of the indicator.

In the modified embodiment shown in Figs. 12 and 13, there is shown a unitary hydraulic power transmission, generally similar to that shown in Fig. 8, and including provisions for cooling the oil column. This embodiment includes the same general means for manual and automatic control, as has been heretofore described in connection with Figs. 9, 10 and 11. In Fig. 12 it will be noted that both the input and output mechanisms are enclosed within a single casing 140 in lieu of the separate casings shown in Fig. 8, and this single casing is closed at its ends by heads 141 and 142 which may be interchangeable with each other. This feature of interchangeability may also apply to all other parts forming the mechanism, thus contributing much to the lowering of the cost of production and simplification of assembly and repair. Since both ends of the mechanism are duplicates, either end may be connected to the driving medium and either end may be the pressure generator end while the other end may be the output end. As in the embodiment shown in Fig. 8, there is a common pintle 143 connected between the rotors of the two units. For purposes of explanation, it will be assumed that the driving medium, as for example a driving motor, is connected to a coupling 144. In this case, a duct 145 in the pintle may be the fluid inlet to the pressure generator, and the duct 146 in the pintle may be the fluid discharge. The duct 146 extends through the valve pintle 143 to the motor end of the mechanism, thereby causing the pressure of the generator or input end to act directly against the ball-like pistons of the motor or output end, and thus imparting motion thereto and with the motor end discharging its fluid back into the duct 145. The duct 145 has a partition 147 inserted in a conduit 148 and intersecting the duct 145 centrally to block the latter so as to cause the fluid discharged from the motor into the duct 145 at one side of the partition to rise up along one side of the conduit 148 into the improved cooling system generally designated 149, herein mounted at the top of the casing of the mechanism; and the fluid returns after cooling down the opposite side of the conduit 148 into the duct 145 at the opposite side of the partition to the intake of the pressure generator. The cooling system 149 consists of a radiator 150 and a fan 151 carried by a shaft 152 and provided with a pulley 153 and a driving belt 154 arranged to be driven by a pulley 155 integral with the coupling 144. The radiator 150 has cavities 156 and 157 formed in and extending crosswise of the radiator base. The cavities 156 and 157 connect at the centers thereof with the conduit 148 but are separated from each other by the partition 147. Another cavity 158 is formed across the top of the radiator 150. Two sets of vertical radiator tubes are provided to complete the fluid circuit through the radiator; one set of which, as indicated at 159, connects between cavity 156 at the base of the radiator and the cavity 158 at the top thereof, and the other set of tubes 160 connects between the top cavity 158 and the bottom cavity 157. A pump 161 is provided in the top cavity 158 for the purposes of applying the necessary air pressure to the oil column to cause cylinder filling on the generator side under conditions of high speed operation. A pressure gauge 162 is provided to permit the establishment of the desired pressure and to indicate any change thereof. A filling cap 163 is provided for convenience in charging the hydraulic fluid column of the mechanism. The system should be preferably charged with liquid to approximately the top of the pump 161 and the remainder of the radiator cavity 158 be left as an air chamber. The modifications disclosed in Figs. 3 to 13 inclusive are being claimed in my divisional application Serial No. 310,589, filed September 20, 1952.

Figs. 14 and 15 disclose still another embodiment of the invention. In this embodiment, the hydraulic mechanism is shown applied for the propulsion of a traction wheel and more particularly to a traction wheel of a vehicle of the automotive type. As shown, a casing 165 may be secured to a suitable support, such as an automotive chassis, by means of pins and bolts fitted to cavities 166, 166 in the casing. The casing 165 is also fitted with elements of construction generally similar to those which appear in several of the embodiments of the invention heretofore described, namely: a cover 167, a pintle 168, a rotor 169 and a cam track 170. The rotor, as in the preceding embodiments, has radially located cylinder bores containing reciprocable pistons of spherical or ball shape, and the cam track is supported by the inner race of an anti-friction bearing against which the pistons react. The rotor 169 has attached to its outwardly extending spindle portion 171, a flange 172 and the latter is secured to the spindle portion by a conical gland 173 which is held in wedged relation between the spindle portion and the flange as by cap screws 174 spaced at intervals around the face of the gland. A brake drum 175 is secured to the inner surface of the flange 172 as by the riveted ends of studs 176, while a wheel flange 177 is secured to the outer face of the flange 172 as by nuts 178 fitted to the outwardly extending threaded portions of the studs 176. A tire rim 179 supporting a conventional pneumatic tire 180 is secured to the wheel flange 177 as by spot welding or by any of the conventional rim locking devices in common use. A brake band 181 is secured in place within the brake drum by means of an anchor member 183 attached to a lug 184 as by bolts 185. A hydraulic brake operating cylinder 186, arranged between the ends of the brake band for the expansion thereof, is secured to a lug 187 as by bolts 188. The wheel motor mechanism herein disclosed is provided with spring loaded pressure responsive devices for the purposes of varying the displacement and, consequently, the torque delivered by the mechanism in accordance with the demands of the conditions of operation. To achieve this, connections are made between an inlet 189 of a pressure cylinder 190 and the pressure side of a pressure generator, as, for example, a pressure generator of the kind shown in Figs. 6 and 8. The cylinder 190 is arranged in a vertical position and is secured to the top of the motor casing 165 and contains a piston 191 which engages the outer race 192 of the anti-friction bearing which supports the cam track 170. A vertical cylinder 193 is secured to the bottom of the casing and contains a plunger 194 which is yieldingly held in engagement with the outer bearing race by a coil spring 195 enclosed in the cylinder. Obviously, as the pressure required to impart motion to the wheel motor increases, the piston 191 in the cylinder 190 acts to move the cam track 170 a greater distance from the axis of the rotor 169, the extent of movement depending upon the reaction to such movement set up by the spring 195 of the plunger 194 located opposite from the piston 191. The effect of such cam track movement would be to increase the piston stroke with a corresponding increase in the turning torque of the mechanism and a reduction in the speed of rotation. Likewise, a reduction in pressure will result in shortening of the piston stroke and increased speed of rotation, and at no pressure the spring 195 may be caused to return the cam track 170 to where its axis coincides to that of the rotor 169 under which circumstances a condition of free wheeling exists. Normally, during wheel rotation, the cam track is eccentrically disposed with respect to the axis of wheel rotation, and under this condition, the rate of wheel rotation may be controlled by reversal of fluid flow through the motor, under which condition it may be caused to function as a pump and then serves as a means for resisting wheel rotation. Obviously, the movement of the vehicle may also be controlled by the braking provisions described above. Any of the previously described mechanisms of the other embodiments may be employed for supplying fluid under pressure to the wheel motor mechanism, but preferably the pressure generator should be provided with a cooling system such as shown in Figs. 12 and 13, scavenger pumps such as shown in Figs.

6 and 8, and a suitable system such as shown in Figs. 4, 5, 6 and 7 for varying the displacement thereof as an auxiliary means for controlling speed and the rate of doing work so as to conform closely to the maximum power of the driving motor. The driving motor for the pressure generator under such conditions may operate at constant speed, a condition very favorable to the use of a diesel-type engine as a driving medium for the automotive vehicle. This embodiment is being claimed in my divisional application Serial No. 202,372, filed December 22, 1950.

In Figs. 16 and 17 there is shown a modified form of hydraulic motor mechanism for the propulsion of a traction wheel. In this construction, the hydraulic mechanism embodies a compound hydraulic wheel driving motor which is generally similar in design to certain of the embodiments above described and similarly consists of a casing 197 which may be secured, as by bolts 198, to a suitable support 199, such as an automotive chassis. Like the form shown in Figs. 14 and 15, the casing is fitted with elements of construction similar to those of several of the preceding embodiments, namely: a cover 200, a valve 201, a rotor 202, and cam tracks. The rotor, in this instance, has two series of radially located cylinder bores arranged side by side and containing reciprocable ball-like pistons engaging cam tracks 203 and 204 supported by the inner races of anti-friction bearings and against which the pistons react in the manner previously described. The rotor has attached to its outwardly extending spindle portion 205, a flange 206 secured to the spindle portion by a conical gland 207 which is held in wedged relation between the spindle portion and the flange 206 as by cap screws 208 in the manner similar to the form described above in connection with Figs. 14 and 15. A wheel flange 209 is secured to the flange 206 as by welding or otherwise. A tire rim 210 supporting a tire 211 may be secured to the wheel flange 209 as by spot welding or otherwise. The rotor 202 is herein journaled on ball bearings 212 and 213, respectively supported by the casing end wall 214 and the cover 200, and, in this instance, the valve pintle corresponding to the pintle 168 of Fig. 14 is omitted. A cylindric member 215, corresponding to the valve pintle, is supported centrally within the rotor and has tube-like projections 216 fitted in packed recesses in the casing end wall, and ducts 217 and 218 in the member 215 extend inwardly through the projections 216 into communication with passages 219 and 220 in the casing end wall and connected respectively to a pressure source and a pressure discharge. The member 215 is formed with suitable fluid distributing grooves and the valve 201, which is of the sleve type, and is secured to the rotor and surrounds the member 215 and has ports for distributing fluid under pressure to and exhausting fluid from the cylinder bores of the rotor to effect recipocation of the pistons. As in the embodiment shown in Fig. 1, valve controlled passages are provided for preventing excessive pressure due to leakage from building up in the casing chamber. The outer races 221 of the anti-friction bearings supporting the cam tracks 203 and 204 are supported within a shiftable annulus 222 which is guided at its sides in the cam track chamber of the casing by steel inserts 223 secured as by screws 224 to the casing side walls. As in the embodiment shown in Figs. 14 and 15, the wheel motor mechanism is provided with spring loaded pressure responsive devices for varying the displacement and, consequently, the torque delivered by the mechanism in accordance with the demands of the conditions of operation. To accomplish this, connections are made between the inlet 225 of a pair of pressure cylinders 226 and the pressure side of the pressure generator. These cylinders are secured in a vertical position at the top of the casing and contain reciprocable pistons 227 which bear against the upper side of the cam track annulus 222. Positioned by screws 228 within the cam track chamber at the bottom of the casing is a spring 229 which acts on the bottom of the cam track annulus to oppose the pressure exerted thereon by the pressure piston 227. Obviously, as the pressure required to impart motion to the wheel motor increases, the pistons 227 in the cylinders 226 act to move the cam tracks 203 and 204 a greater distance from the axis of the rotor 202, the extent of movement depending upon the reaction to such movement set up by the spring 229 in opposition to the pistons. The effect of such cam track movement would be to increase the piston stroke in the manner of the embodiment above described in connection with Figs. 14 and 15 with a corresponding increase in the turning torque of the mechanism and reduction in the speed of rotation. Likewise, a reduction in pressure will result in shortening of the piston stroke and increased speed of rotation and at no pressure the spring 229 may be caused to return the cam tracks 203, 204 to where their axes coincide with the axis of the rotor 202 under which circumstances a condition of free wheeling exists. Normally, during wheel drive, the cam tracks are eccentrically disposed with respect to the axis of wheel rotation, and under this condition, wheel rotation may be controlled by reversal of fluid flow through the reversely driven motor under which condition the motor may be caused to function as a pump, thereby to serve as a means for resisting or braking wheel rotation.

In the modified embodiment shown in Figs. 18 to 27 inclusive, the pressure generator or pump is of the multi-stage type. The closed fluid supply and cooling system is similar to that above described in connection with Figs. 12 and 13, and the structure of each pump unit is similar to certain of the embodiments above described. This embodiment embodies unique features and operating characteristics not present in the forms of the invention above described, chief of which are the balanced forces within the rotor and pintle which greatly relieve the bearing loads under high pressure operation and secondly permits of obtaining different operating characteristics by the provision of interchangeable pintles and by inserting the particular one required for the desired perfomance in the manner to be later explained in connection with later embodiments. There is a casing 235 having mounted therein a stationary shaft or pintle 236 generally like the pintles of certain of the embodiments above described and similarly held in place by bolts or screws. A rotor 237 arranged in the casing chamber is journaled in bearings respectively supported by the pintle and an end closure of the casing in a manner similar to that shown in Fig. 1. The driving medium, as for example, a driving motor, is connected to a coupling 144' secured to an input shaft 238 intergral with the rotor. The rotor, in this instance, has four series of radially located cylinder bores arranged side by side longitudinally of the rotor in parallel transverse planes and containing reciprocable ball-like pistons engaging cam tracks 239, 240, 241 and 242 respectively supported by the inner races of anti-friction bearings movably mounted within the casing and against which the pistons react in the manner previously described. The rotor shaft carries a scavenger pump for relieving excessive pressures in the casing chamber, similar to those shown in Figs. 6, 7 and 8. Fluid may be supplied to the pressure generator through a conduit 243 connected to the cooling system and to a longitudinal inlet duct 244 in the pintle 236, and arranged in the pintle in parallelism with the inlet duct is a discharge duct 245 having a connection at 246 with a suitable point of discharge or pressure utilization. The cam tracks are respectively engaged by adjusting screws 248 threaded within the casing walls, one of which is shown in detail in Fig. 21, and these screws provide means for adjusting the displacement of each of the stages so that the displacement may be progressively smaller in the several stages. In other words, these adjusting screws limit the eccentricity of the several cam tracks 239, 240, 241 and 242 with respect to the axis of rotor rotation. Spring loaded devices 249 act on the cam tracks to provide for yielding loading thereto thereby to resist movement of the cam tracks toward positions of coincidence with the rotor axis. The cam tracks 239 and 241 are arranged eccentrically opposite to cam tracks 240 and 242 to provide adequate space for the devices 249 at opposite sides of the casing, as shown in Fig. 20. The devices 249 comprise plungers 250 held against the cam track bearings by coil springs 251 whose compression may be adjusted by screw threaded plugs 252 secured within the casing. The compression of the springs 251 is differently adjusted for the several stages so that progressively greater pressure is applied to the cam tracks of the different stages. Accordingly, the maximum displacement of the four stages becomes progressively smaller in the succeeding stages so that there is a building up of pressure through the several stages from the intake pressure to the terminal discharge pressure, and there will be a yielding of the springs associated with the several stages since when the volume is greater than the displacement, the springs will yield to accommodate the fluid. For example, if the springs of the first stage were set to yield when the fluid is at 500 pounds in the first stage, the pressure when intake ceases in the second stage will be 500 pounds, while the pressure in the third stage at the end of intake in any given pumping chamber will be 1000 pounds, and in the fourth stage 1500, so that the terminal discharge pressure would be 2000 pounds. By varying the compression of the loading device of the fourth stage, the terminal discharge pressure may be varied. The portion of the pintle which extends into the rotor-bore forms a valve 253 and serves to separate the longitudinal ducts 244 and 245, thus preventing flow of pressure therebetween as is also shown in the embodiments above described. The opposite sides of this valve portion are cut away at 254 and 255, and the inlet and discharge cavities provided by these cut away portions communicate with the ports leading to the radial bores of the cylinders. The inlet duct communicates with the upper inlet cavities 254 as shown in Fig. 21 and the lower discharge cavities 255 communicate with the discharge duct. As the rotor revolves, fluid is drawn from inlet cavities to the upper cylinder bores in the upper stage through three upper ports (Fig. 21) and fluid under pressure is discharged from the first stage through three lower ports, and fluid flows through a passage 256 in the pintle to the intake of the second stage. The fluid discharged from the second stage flows through a passage 257 in the pintle to the intake ports of the third stage and from the third stage through a pintle-passage 258 to the fourth stage intake. Finally, the fluid is discharged from the fourth stage to the discharge duct 245.

Figs. 28 to 37 inclusive illustrate a modification of the pressure generator shown in Figs. 18 to 27 inclusive, and in this construction the adjusting screws 248 for the cam tracks are omitted and a different form of pintle replaces the pintle 236. In this embodiment the multi-stage characteristic is omitted and the pressure generator is designed to provide multi-power or volume, with the four series of pump cylinders having the same terminal discharge pressures. The pintle or shaft 236' has formed therein a longitudinal inlet duct 260, and a longitudinal discharge duct 261 which are connected through the cooling system in a manner similar to that shown in Figs. 18 and 19. The spring loaded devices 249' acting on the cam tracks are, in this instance, set at the same compression. The valve portion 253' of the pintle is cut away at 254' and 255', and the inlet and discharge cavities provided by these cut away portions communicate with the port leading to the radial bores of the cylinders. The inlet duct 260 communicates through ports 262 with two of the upper cavities and through ports 263 with two of the lower cavities, while the discharge of the lower cavities communicates through ports 264 with the other two upper cavities and through ports 265 with the other two lower cavities. By this arrangement of the inlet and discharge ports, there is provided balance forces within the rotor and pintle, thereby greatly relieving the bearing loads under high pressure operation. As in the embodiment above described in connection with Figs. 18 to 27 inclusive, a conduit 243 leads from the cooling system to the inlet duct while the discharge duct has a connection at 246 with a suitable point of use, and after use, the fluid flows back to the cooling system. Thus by the provision of the four series of pump chambers discharging into a common discharge duct, a relatively large volume of fluid under the same terminal pressure may be conducted to the point of pressure utilization while the pump unit is held under relatively compact overall dimensions. Otherwise, this embodiment is generally similar to that shown in Figs. 18 to 27 inclusive.

In the modification shown in Figs. 38 to 46 inclusive, a pressure generator of the multi-delivery type is provided wherein the discharges from the several series of pump chambers lead to different points of pressure utilization. In this embodiment, the pump structure is generally similar to that shown in Figs. 27 to 38 inclusive with the exception that a different form of pintle replaces the pintle 236'. A pintle or shaft 236'' has formed therein a longitudinal inlet duct 270 arranged centrally therein, and this inlet duct has spaced thereabout four longitudinal discharge ducts 271, 272, 273 and 274 which are suitably connected to different points of pressure utilization. The spring loaded devices 249' are the same as those shown in Figs. 29 and 30 and are likewise set at the same compression. The valve portion 253'' of the pintle is cut away at 254'' and 255'', and the inlet and discharge cavities provided by these cut away portions communicate with the ports leading to the radial bores of the cylinders. The axial inlet duct 270 in the pintle communicates through ports 275 with two of the upper cavities and through ports 276 with two of the lower cavities, while the discharge ducts 272 and 274 communicate through ports 277 with the other two upper cavities, while the discharge ducts 271 and 273 communicate through ports 278 with the other two lower cavities. Thus not only are separate discharges provided for the several pump chambers but also an extremely well balanced rotor and pintle construction are provided as in the other two last described embodiments. Otherwise this embodiment of the invention is similar to that shown in Figs. 28 to 37 inclusive.

The embodiments disclosed in Figs. 18 to 46 inclusive are being claimed in my divisional application Serial No. 202,373, filed December 22, 1950.

As a result of this invention, an improved hydraulic mechanism is provided which may be operated efficiently at relatively high speeds and which is not only highly efficient and may be easily applied and operated and also highly responsive to the controls thereof but is also of relatively low weight, compact and relatively durable, well adapted to meet the demands of service encountered. The improved hydraulic mechanism, in certain of its embodiments, may be operated either as a pressure generator or a pressure motor, and by the provision of the improved control means in certain embodiments, the displacement of the mechanism may be readily varied. Further, by the provision of the improved construction of the hydraulic mechanism and the improved control means associated therewith, variation of displacement and reversal may be readily effected. By the provision of the improved scavenger pump arrangement, all leakage of fluid may be salvaged and returned to the hydraulic fluid column. Obviously, the need of special drain lines to care for leakage is eliminated. In certain of the embodiments, the pressure generator may have different operating characteristics by a simple change of parts, it being possible in one arrangement to operate the pressure generator as a multi-stage pump, in another arrangement as a multi-power or volume pump, and in still another arrangement as a multi-delivery pump. By the provision of the improved rotor and cylinder arrangement and the ball-like pistons engaging cam tracks formed on the inner races of anti-friction bearings, friction and resultant wear is reduced to a minimum. The novel design of the motor is well adapted for the propulsion of a traction wheel, and may at times serve as a pump, to retard or brake wheel rotation. Other uses and advantages of the invention will be clearly apparent to those skilled in the art.

While there are in this application specifically described different forms and modifications which the invention may assume in practice, it will be understood that these forms and modifications are shown for purposes of illustration and that the invention may be further modified and embodied in various other forms without departing from its spirit or the scope of the appended claims.

What I claim as new and desire to secure by Letters Patent is:

1. In a mechanism of the character described, a casing, a rotor rotatably mounted within said casing and having a plurality of radially disposed cylinders, spherical pistons in said cylinders, and a standard anti-friction bearing arranged within said casing eccentrically with respect to and surrounding said rotor with its axis at all times parallel to the rotor axis and including concentric bearing races providing annular trackways for receiving rolling bearing elements, said bearing having its inner race freely rotatable and formed with a smooth inner cylindrical surface providing a cam track freely against which said spherical pistons directly bear.

2. In a mechanism of the character described, a casing having a tapered axial bore in one end wall, a rotor mounted for rotation within said casing, a valve pintle mounted in said casing in axial alinement with said rotor and having a tapered portion fitting said casing-bore, and adjustable means for securing said pintle against outward axial release to said casing and for adjusting said pintle axially inwardly with respect to said casing to bring the tapered surfaces into proper contact, said adjustable means having adjusting portions arranged exteriorly of said casing and releasable to permit outward axial removal of said pintle from the exterior of said casing.

3. In a mechanism of the character described, a casing, a rotor mounted for rotation within said casing, a valve pintle mounted in said casing in axial alinement with the axis of said rotor, axially spaced bearings supported within said casing on which said rotor is journaled, and adjustable means movable axially relative to said rotor and including adjusting elements having an adjusting portion arranged exteriorly of said casing for effecting concurrent adjustment of said bearings from the exterior of said casing for the maintenance of alinement between said rotor and said pintle.

4. In a mechanism of the character described, a casing, a rotor mounted for rotation in said casing, axially spaced bearings supported within said casing on which said rotor is journaled, and means adjustable from the exterior of said casing axially relative to said rotor and embodying a yieldable load transmitting element for yieldingly loading said bearings and effecting loading of one bearing through said rotor.

5. In a mechanism of the character described, a casing having opposite end wall portions, a rotor mounted for rotation within said casing, axially spaced bearings supported within said casing by said end wall portions respectively and by which said rotor is journaled, said bearings adapted to take both the radial and thrust loads of said rotor within said casing, a rotor-pintle mounted within said casing in axial alinement with said rotor, and means adjustable from the exterior of said casing relative to said rotor-pintle and including a yieldable load transmitting element having a yieldable portion movable axially relative to said rotor for yieldingly applying a predetermined thrust load to said bearings for the maintenance of alinement between said rotor and said pintle.

6. In a hydraulic mechanism, a casing having a chamber, a rotor journaled within said casing and having radially located cylinder bores, spherical pistons reciprocably and rotatably mounted in said cylinder bores, and an anti-friction bearing including concentric inner and outer races providing annular trackways for rolling bearing elements, said bearing having its outer race secured to said casing and arranged eccentrically with respect to and surrounding said rotor with its axis maintained parallel with said rotor axis, the inner race of said bearing freely rotatable relative to said casing and rotor and formed with a smooth cylindrical inner surface providing a cam track with which said spherical pistons have free rolling contact and directly against which said pistons react.

7. In a hydraulic mechanism, a casing, a rotor journaled in said casing and having radially located cylinder bores containing reciprocable pistons, a cam track arranged in said casing eccentrically with respect to and surrounding said rotor, said pistons bearing directly against said cam track, axially spaced alined anti-friction bearings supported within said casing and by which said rotor is journaled, and means adjustable from the exterior of said casing for yieldingly applying a predetermined load to said bearings and including a yieldable load transmitting element having a yieldable portion movable axially relative to said rotor.

8. In a hydraulic mechanism, a casing, a rotor journaled within said casing, said casing supporting axially spaced anti-friction bearings by which said rotor is journaled, a stationary pintle fixed to said casing and extending into said rotor in axial alinement therewith, one of said bearings being supported by said pintle, and means adjustable exteriorly of said casing and including a yieldable load transmitting element having a portion yieldable axially relative to said rotor and said pintle for yieldingly applying a predetermined load on said bearings to maintain alinement between said rotor and said pintle.

9. In a mechanism of the character disclosed, a casing having a bore opening through one end thereof, a detachable end closure member for the open end of said bore, a rotor arranged within said chamber, bearings supported within the end wall of said casing and by said closure member and by which said rotor is journaled, said rotor having radially located cylinder bores, spherical pistons reciprocably and rotatably mounted in said cylinder bores, an anti-friction bearing arranged in said casing-bore and including concentric inner and outer races providing annular trackways for receiving rolling bearing elements, said end closure member engaging said outer bearing race for rigidly securing said bearing in position in said casing-bore, said anti-friction bearing arranged eccentrically with respect to and surrounding said rotor with its axis parallel with the rotor axis and arranged in common transverse planes with said cylinder bores, and said inner bearing race being freely rotatable relative to said rotor and said casing and having a smooth inner circular surface providing the inner wall of said anti-friction bearing and serving as a cam track against which said spherical pistons directly react with said pistons in free rolling contact with said smooth inner surface, and means for detachably securing said end closure member to said casing.

10. In a hydraulic mechanism, a casing having a chamber, a rotor journaled within said casing and having radially located cylinder bores, spherical pistons reciprocably mounted in said cylinder bores, and a standard anti-friction bearing having concentric inner and outer bearing races and provided with anti-friction rolling bearing elements arranged between said races, said bearing arranged eccentrically with respect to and surrounding said rotor in common transverse planes with said cylinder bores and pistons, the axes of said rotor and said bearing at all times disposed in parallel relation, and said inner race of said bearing being freely rotatable relative to said casing and rotor and formed with a smooth cylindrical inner surface providing a cam track directly against which said spherical pistons react with said spherical pistons in free rolling contact with said inner cylindrical surface of said inner bearing race.

JOSEPH F. JOY.

References Cited in the file of this patent

UNITED STATES PATENTS

| Number | Name | Date |
|---|---|---|
| 1,325,434 | Carey et al. | Dec. 16, 1919 |
| 1,423,386 | Bair | July 18, 1922 |
| 1,526,343 | Jouanneaux | Feb. 17, 1925 |
| 1,655,740 | Robson | Jan. 10, 1928 |
| 1,850,083 | Noltein | Mar. 22, 1932 |
| 1,904,496 | Maw | Apr. 18, 1933 |
| 2,021,354 | Ernst | Nov. 19, 1935 |
| 2,041,172 | Ernst | May 19, 1936 |
| 2,080,810 | Douglas | May 18, 1937 |
| 2,101,829 | Benedek | Dec. 7, 1937 |
| 2,105,454 | Ferris | Jan. 11, 1938 |
| 2,186,409 | Ferris | Jan. 9, 1940 |
| 2,211,402 | Benedek | Aug. 13, 1940 |
| 2,213,236 | Benedek | Sept. 3, 1940 |
| 2,230,054 | Ernst | Jan. 28, 1941 |
| 2,273,468 | Ferris | Feb. 17, 1942 |
| 2,292,181 | Tucker | Aug. 4, 1942 |
| 2,349,161 | Frimel | May 16, 1944 |
| 2,381,910 | Joy | Aug. 14, 1945 |
| 2,418,123 | Joy | Apr. 1, 1947 |

FOREIGN PATENTS

| Number | Country | Date |
|---|---|---|
| 3,827 | Great Britain | Feb. 13, 1914 |
| 418,052 | France | Sept. 17, 1910 |
| 481,093 | Great Britain | Mar. 7, 1938 |
| 578,392 | Great Britain | 1946 |